United States Patent [19]

Müller

[11] Patent Number: 5,363,712
[45] Date of Patent: Nov. 15, 1994

[54] MANUAL TRANSMISSION OF A MOTOR VEHICLE

[75] Inventor: Robert Müller, Mönsheim, Germany

[73] Assignee: Dr. Ing. h.c.F. Porsche AG, Germany

[21] Appl. No.: 22,107

[22] Filed: Feb. 25, 1993

[30] Foreign Application Priority Data

Feb. 25, 1992 [DE] Germany .................. 4205670

[51] Int. Cl.$^5$ ............................. F16H 5/06
[52] U.S. Cl. ................................ 74/337.5
[58] Field of Search ........... 74/335, 337.5, 339, 74/363, 364, 365

[56] References Cited

U.S. PATENT DOCUMENTS

| | | | |
|---|---|---|---|
| 4,409,858 | 10/1983 | Lasoen | 74/337.5 |
| 4,574,652 | 3/1986 | Shichinohe et al. | 74/474 |
| 4,635,506 | 1/1987 | Imaizumi et al. | 74/745 |
| 4,656,882 | 4/1987 | Kerr | 74/337.5 |
| 4,713,979 | 12/1987 | Muto et al. | 74/337.5 |
| 4,730,506 | 3/1988 | Kageyama | 74/337.5 |
| 4,879,919 | 11/1989 | Sekizaki | 74/337.5 |

FOREIGN PATENT DOCUMENTS

| | | |
|---|---|---|
| 0179544 | 4/1986 | European Pat. Off. . |
| 2500101 | 8/1982 | France . |
| 937576 | 1/1956 | Germany . |
| 1776716 | 8/1958 | Germany . |
| 2235368 | 10/1973 | Germany . |
| 3205692 | 7/1988 | Germany . |

*Primary Examiner*—Dirk Wright
*Attorney, Agent, or Firm*—Evenson, McKeown, Edwards & Lenahan

[57] ABSTRACT

A synchronized manual transmission of a motor vehicle is actuated by a shift roller. The transmission gears can be shifted only by the simultaneous closing of two synchronizer clutches. At least one sliding sleeve of a synchronizer clutch is adjustable independently of the position of the shift roller into the neutral position and inversely from the neutral position into the position determined by the shift roller.

10 Claims, 4 Drawing Sheets

MANUAL TRANSMISSION OF A MOTOR VEHICLE

BACKGROUND AND SUMMARY OF THE INVENTION

This application is related to U.S. Ser. No. 08/022,108 filed on even date herewith, now U.S. Pat. No. 5,365,800.

The present invention relates to a manual transmission of a motor vehicle having a plurality of transmission gears which can be shifted by synchronizer clutches, gearwheel plates being formed by mutually meshing loose wheels and fixed wheels, and the transmission gears being shiftable by the coupling of the loose wheels with the pertaining transmission shafts.

A manual transmission of this type is shown in U.S. Pat. No. 4,409,858, and is controlled by a shift roller and used mainly in motorcycles. It is a disadvantage of that transmission that a complicated shifting arrangement is required in order to shift from the higher transmission gears directly into idling.

An object of the invention is to provide a manual transmission which can be shifted in an easier and in an operationally more reliable manner.

This and other objects are achieved by the present invention which provides a manual transmission of a motor vehicle, comprising a plurality of transmission gears with gearwheel pairs formed by mutually meshing loose wheels and fixed wheels, and synchronizer clutches coupleable to the transmission gears such that the transmission gears are shifted by the simultaneous closing of two of the synchronizer clutches, the synchronizer clutches having sliding sleeves. A shift roller is coupleable to the synchronizer clutches to actuate the synchronizer clutches. At least one of the sliding sleeves is adjustable independently of the position of the shift roller into a neutral position and from the neutral position into a position determined by the shift roller.

Even when all transmission gears can be shifted only by the simultaneously closing of two synchronizer clutches, as in embodiments of the invention, it becomes possible to bring the sliding sleeve of at least one synchronizer clutch, independently of the respective position of the shift roller, into the neutral position and inversely from the neutral position into the position determined by the shift roller.

DETAILED DESCRIPTION OF THE DRAWINGS

Figure 1:
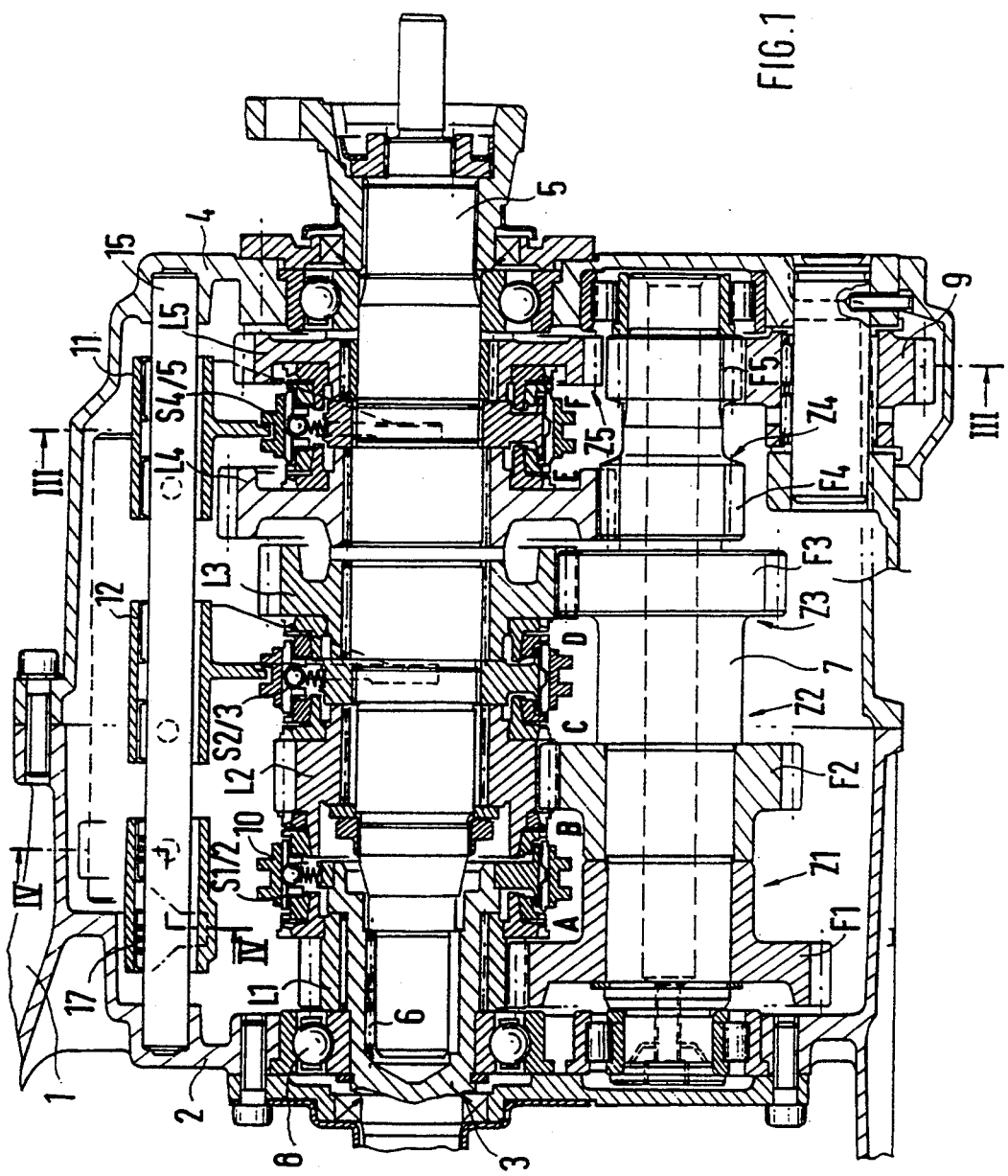
FIG. 1 is a longitudinal sectional view of a manual transmission constructed in accordance with an embodiment of the present invention.

A manual transmission of a motor vehicle comprising six forward gears and one reverse gear is enclosed by a transmission casing 1. An input shaft 3 is disposed in one end face wall 2 of the transmission casing and an output shaft 5 is disposed in the other end face wall 4. On its other side, the output shaft 5 is disposed close to the end face wall 2 centrically in a needle bearing 6 in the hollow-drilled input shaft 3. In parallel to the input shaft 3 and the output shaft 5, an auxiliary shaft 7 is disposed in the transmission casing 1 on which all fixed wheels F are disposed of the gearwheel pairs Z1, Z2, Z3, Z4 and Z5 which each consist of one loose wheel L and one fixed wheel F.

The loose wheel L1 of Z1 is disposed on the input shaft 3 and is axially supported on the ball bearing 8 of the input shaft 3. The other loose wheels L2, L3, L4, L5 are disposed on the output shaft 5 and mesh with the fixed wheels F2, F3, F4, F5. The loose wheel L5 for the reverse gear R engages by way of an idler 9 with the fixed wheel F5 in order to obtain a reversal of the rotating direction. The loose wheels L2, L3, L4, L5 can be coupled with the output shaft 5 by means of commercially available, identically constructed synchronizer clutches in a manner known to one of ordinary skill in the art, and the loose wheel L1 can be coupled with the input shaft 3.

In the left closing position A of a synchronizer clutch S $\frac{1}{2}$, the gearwheel pair Z1 is coupled with the synchronizer clutch S $\frac{1}{2}$; in the right closing position B, the gearwheel pair Z2 is coupled with the synchronous clutch S $\frac{1}{2}$. A synchronizer clutch S $\frac{2}{3}$ couples the gearwheel pair Z2 in the closing position C, and in the closing position D, the gearwheel pair Z3. Another synchronizer clutch S 4/5 couples the gearwheel pair Z4 in the closing position E, and the gearset Z5 of the reverse gear in the closing position F. In order to shift one of the transmission gears G1, G2, G3, G4, G5, G6 or R, two synchronizer clutches respectively are brought into the closing position. The following table indicates which closing position is implemented for the shifting of the transmission gears. The table also contains the gear ratios i and the step ratios, in the manner of examples. The overall spread $\Psi$ of the gear ratios of the manual transmission is 5.2.

| S.M | A | B | C | D | E | F | Ratio |
|-----|---|---|---|---|---|---|-------|
| R   | X |   |   |   |   | X | i |
| G1. | X |   |   |   | X |   | 5.20 |
|     |   |   |   |   |   |   | ρ |
|     |   |   |   |   |   |   | 1.65 |
| G2. |   | X |   |   | X |   | 3.152 |
|     |   |   |   |   |   |   | 1.492 |
| G3. | X |   |   | X |   |   | 2.112 |
|     |   |   |   |   |   |   | 1.2 |
| G4. | X |   | X |   |   |   | 1.65 |
|     |   |   |   |   |   |   | 1.29 |
| G5. |   | X |   | X |   |   | 1.28 |
|     |   |   |   |   |   |   | 1.28 |
| G6. |   | X | X |   |   |   | 1.00 |

For the shifting of the five lower transmission gears G1 to G5 and of the reverse gear R, two gearwheel pairs respectively are required. For the shifting of the 6th gear G6, the loose wheel L2 is connected by means of the synchronizer clutch. S $\frac{1}{2}$ in its closing position B with the input shaft 3 and by means of the synchronizer clutch S $\frac{2}{3}$ in its closing position C with the output shaft 5 so that a direct throughdrive takes place without any change of ratio from the input shaft 3 to the output shaft 5. The other ratios i1 to i5 are selected such that the gears G1 and G2 have a desired higher spread than is possible in the case of a geometric grading with a constant step ratio γ. The progressive gear grading is made possible by the fact that a first range shifting is implemented between the gears G1 and G2, and a second range shifting is implemented between the non-adjacent gears G3 and G5.

In order to be able to bring the synchronizer clutches into the closing position, the shift forks 11, 12, 13 (see FIG. 2), which are actuated by a shift roller 14, engage in the sliding sleeves 10 of the synchronizer clutches. The shift roller 14 is constructed in a conventional manner and causes, by means of curved paths, an axial shifting of the shift forks. The shift forks 11, 12 are longitudinally slidably and rotatably disposed on a shaft 15 fixed to the casing, and can be shifted directly by the shift roller 14 via pins 16. On the shaft 15, a driving device 17 is also disposed and can be actuated by the shift roller 14 via a pin 16. A coupling finger 19 engages in a groove 18 of the driving device 17. The coupling finger 19 is fastened on a shaft 20 on which the shift fork 13 is disposed.

Figure 4:
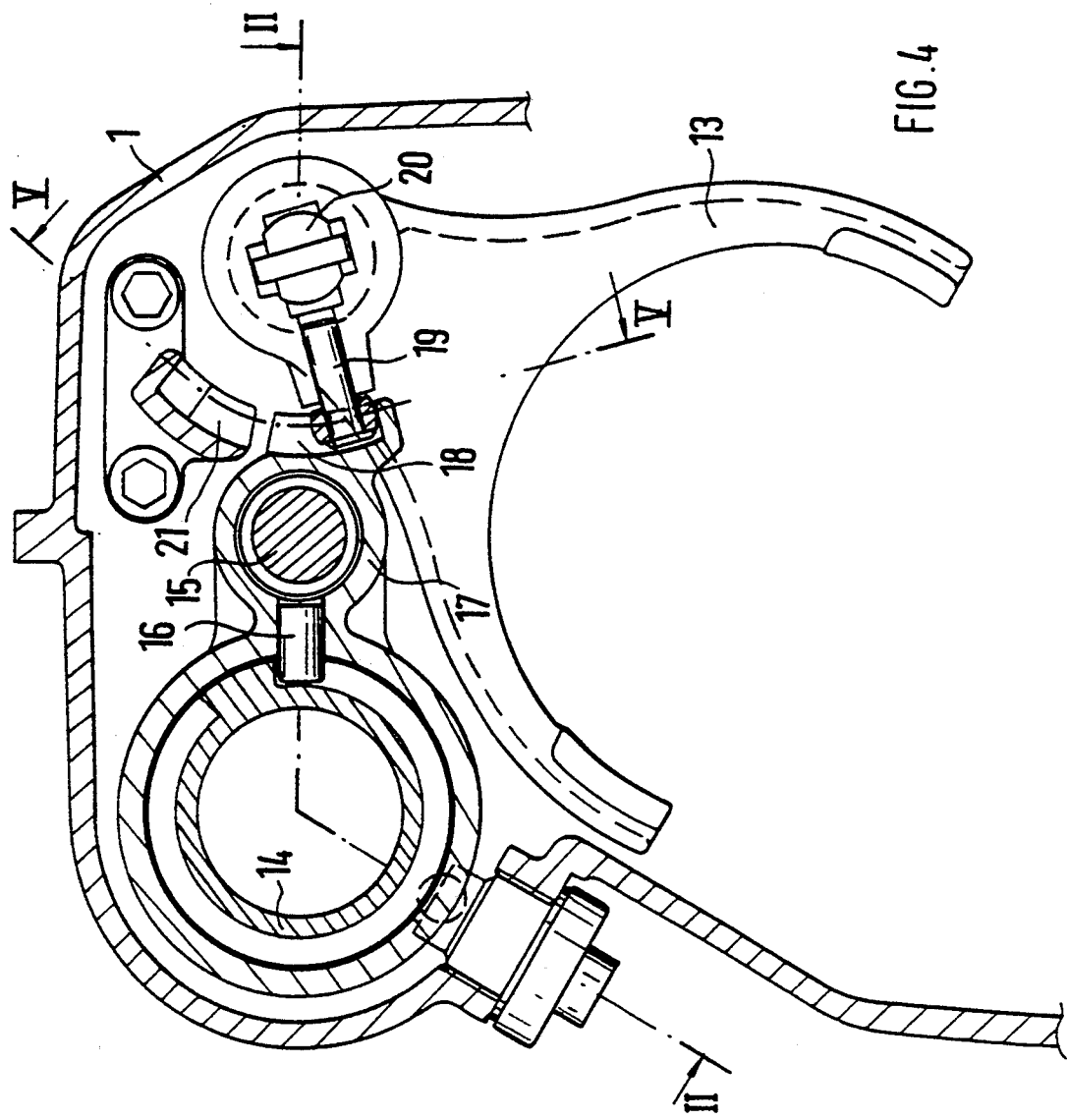
FIG. 4 is a cross-sectional view according to Line IV—IV of FIG. 1.
Figure 5:
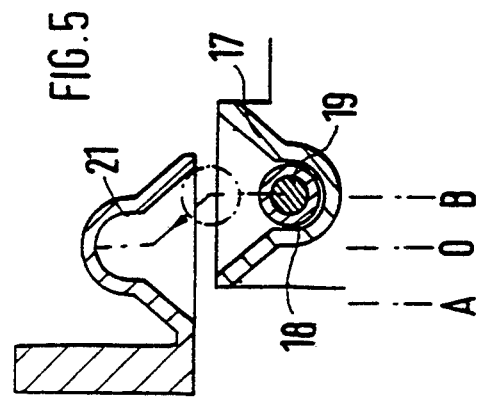
FIG. 5 is a developed view in plane V—V of FIG. 4.

As seen in FIG. 4, when the synchronizer clutch S $\frac{1}{2}$ is to be brought into its center neutral position in order to shift the transmission into idling, the coupling finger 19 is swivelled out of the groove 18 and is swivelled into a curved guide 21 fixed to the housing.

The groove 18 of the driving device 17 as well as the curved guide 21 have V-shaped openings which are directed toward one another and which, when the coupling finger 19 is swivelled out of the driving device 17, cause an axial displacement of the synchronizer clutch S $\frac{1}{2}$ into the neutral position. When the coupling finger 19 is swivelled into the driving device 17, an axial displacement into the shifting position is caused, which is determined by the shift roller 14. Thus, while the transmission is in the neutral position (coupling finger 19 swivelled out), by rotation of the shift roller 14, any gear can be preselected and can be shifted by the swivelling-in of the coupling finger 19.

The exemplary manual transmission requires four gearwheel pairs for six forward gears. The transmission can be expanded arbitrarily, in which case, by means of the addition of another gearwheel pair, two additional transmission gears can be provided.

Figure 2:
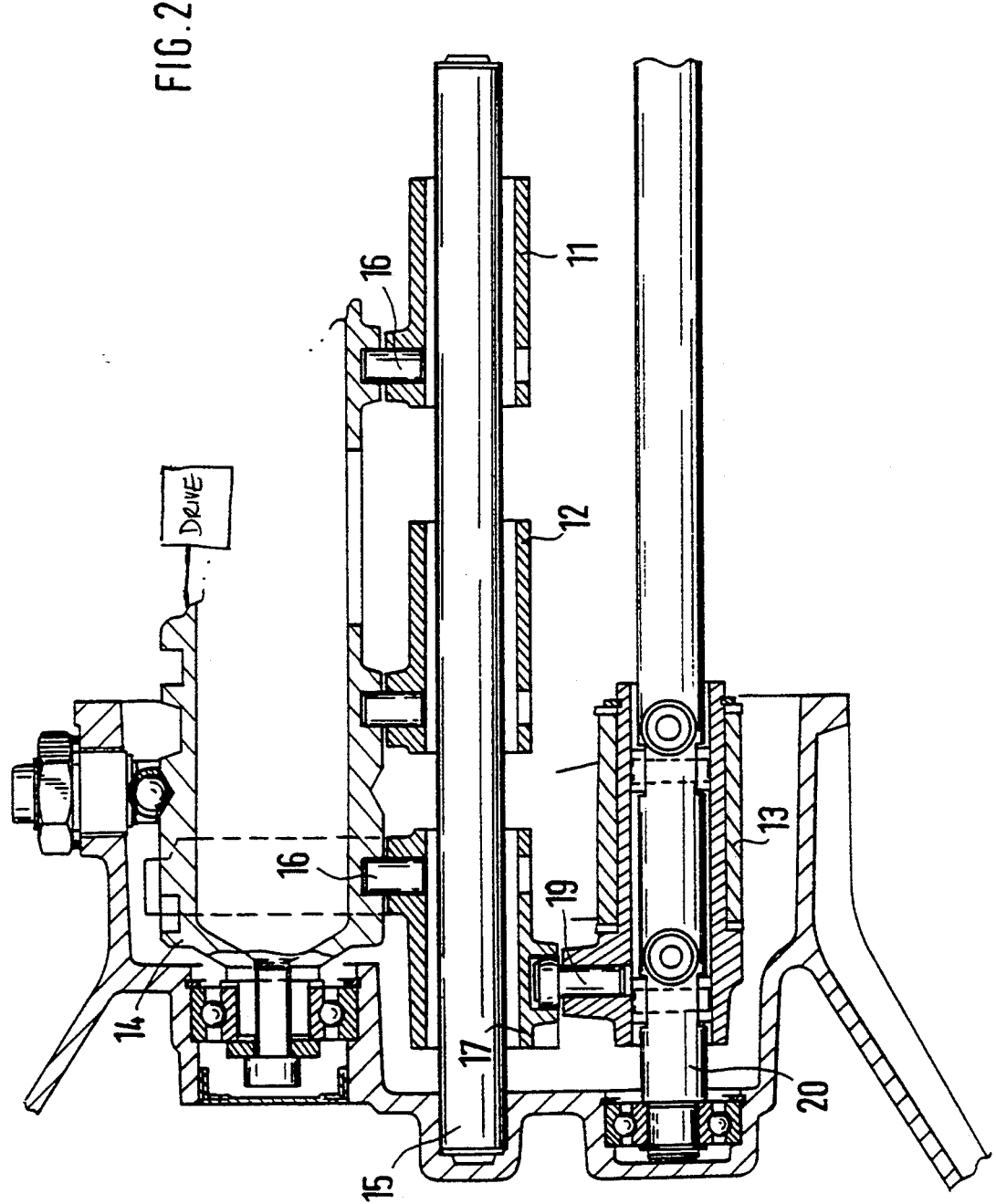
FIG. 2 is a longitudinal sectional view according to Line II—II of FIG. 4.
Figure 3:
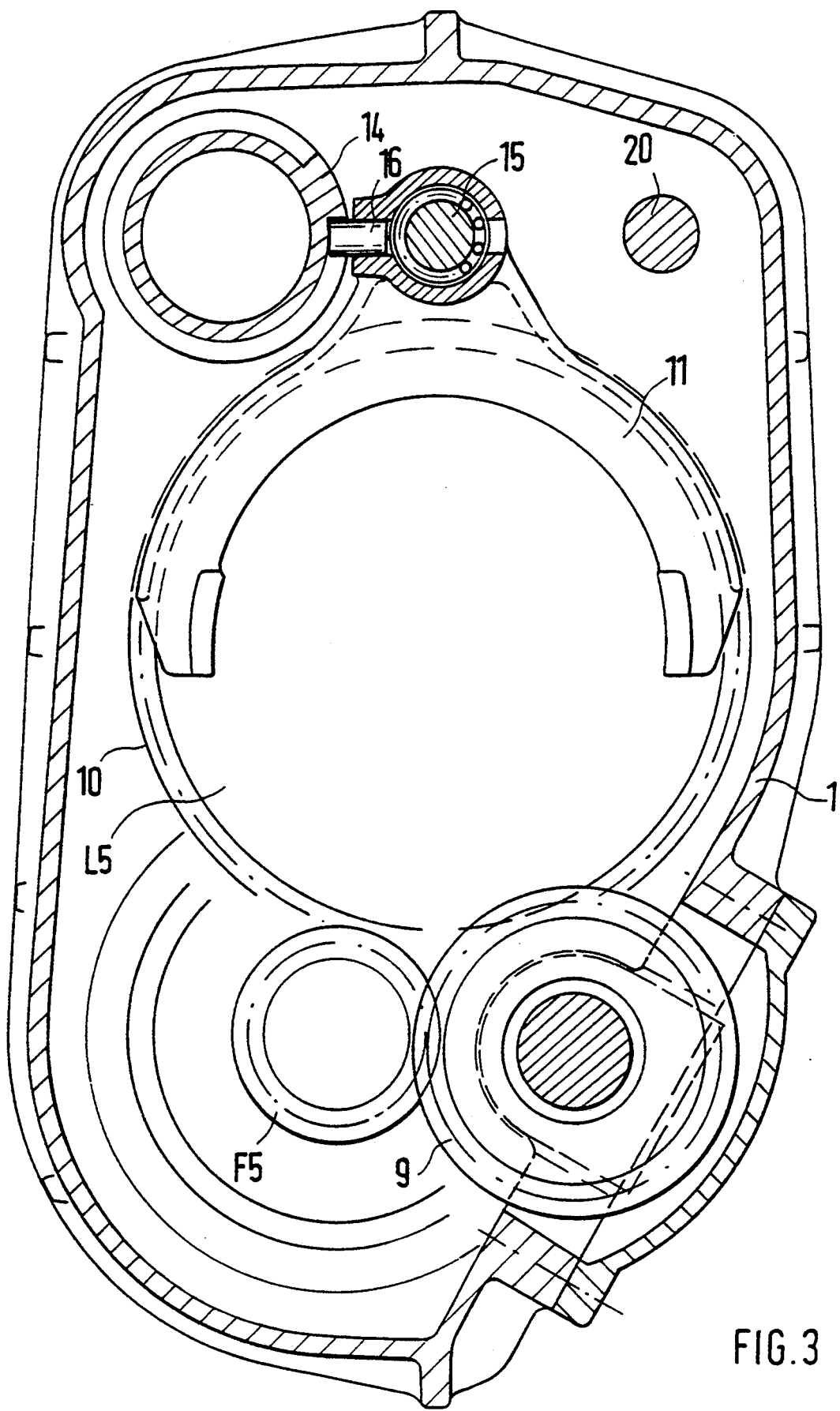
FIG. 3 is a cross-sectional view according to Line III—III of FIG. 1.

FIG. 2 shows schematically the drive for the shift roller 14. The shift roller 14 can be manually operated via a step-by-step system, or is actuatable by either a pneumatic or electric servo drive, as known to one of ordinary skill in the art.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A manual transmission of a motor vehicle, comprising:
    a plurality of transmission gears with gearwheel pairs formed by mutually meshing loose wheels and fixed wheels;
    synchronizer clutches coupleable to the transmission gears such that the transmission gears are shifted by the simultaneous closing of two of said synchronizer clutches, the synchronizer clutches having sliding sleeves; and
    a shift roller coupleable to the synchronizer clutches to actuate the synchronizer clutches;
    wherein at least one of said sliding sleeves is adjustable independently of the position of the shift roller into a neutral position and from the neutral position into a position determined by the shift roller.

2. A manual transmission according to claim 1, further comprising shift forks, which are actuated by the shift roller, and which are engageable in the sliding sleeves of the synchronizer clutches.

3. A manual transmission according to claim 2, wherein a first one of shift forks, is operable to be uncoupled from the shift roller which actuates said first shift fork.

4. A manual transmission according to claim 3, further comprising a driving device and a coupling finger, which is disengageable from the driving device, that connect said first shift fork with the shift roller.

5. A manual transmission according to claim 4, further comprising a curved groove in the driving device and a curve guide fixed to a transmission housing, wherein the coupling finger is swivellable out of the curved groove and into a curve guide.

6. A manual transmission according to claim 4, wherein the coupling finger and the shift first fork are arranged on a common shaft.

7. A manual transmission according to claim 4, further comprising a shaft on which the driving device is rotatably disposed on which second and third ones of the shift forks are rotatably and longitudinally slidably disposed, the driving device and the shift forks being actuatable by the shift roller via pins.

8. A manual transmission according to claim 1, wherein one of said synchronizer clutches participates in the shifting of all transmission gears such that, for each shifted transmission gear, the synchronizer is either in either a first or second closing position.

9. A manual transmission according to claim 1, wherein the shift roller is operated manually via of a step-by-step systems.

10. A manual transmission according to claim 1, wherein the shift roller is actuatable by at lest one of a pneumatic and an electric servo drive.

* * * * *